(No Model.)
O. HANSEN.
AXLE NUT.
No. 425,786.　　　　　　　　Patented Apr. 15, 1890.
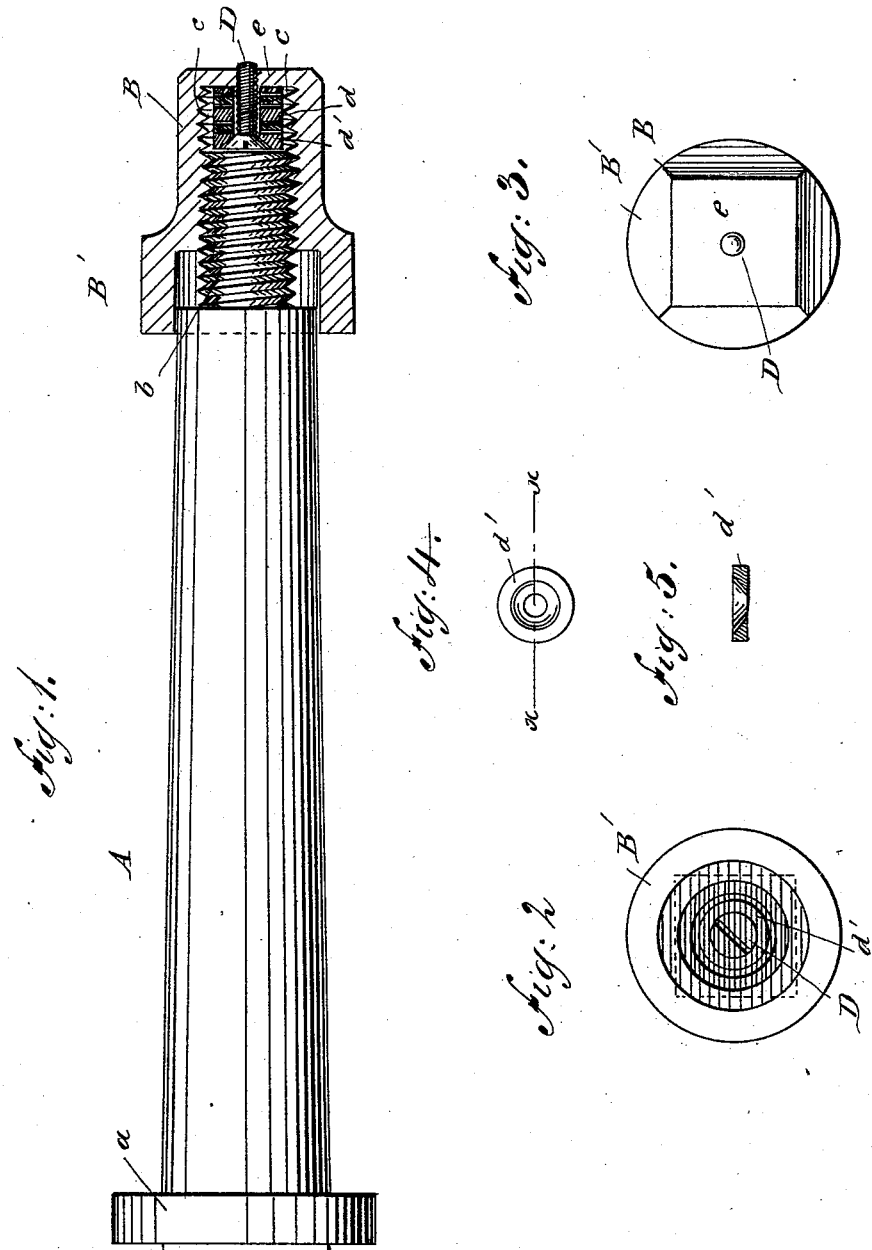
WITNESSES:
Chas. Nida.
C. Sedgwick
INVENTOR:
O. Hansen
BY
Munn &Co.
ATTORNEYS

UNITED STATES PATENT OFFICE.

OLE HANSEN, OF MOUNT PLEASANT, UTAH TERRITORY.

AXLE-NUT.

SPECIFICATION forming part of Letters Patent No. 425,786, dated April 15, 1890.

Application filed December 27, 1889. Serial No. 335,105. (No model.)

*To all whom it may concern:*

Be it known that I, OLE HANSEN, of Mount Pleasant, in the county of San Pete and Territory of Utah, have invented a new and Improved Axle-Nut, of which the following is a full, clear, and exact description.

My invention relates to improvements in axle-nuts; and the object of my invention is to provide a nut that may be applied to all kinds of vehicle-axles, and by means of which any desired amount of play may be given to the wheel upon the axle, and by means of which the wear of the axle may be quickly taken up or counteracted without the use of the ordinary washer.

The invention consists in the particular construction and arrangement of parts, as hereinafter fully described, and pointed out in the claim.

Reference is to be had to the accompanying drawings, forming a part of this specification, in which similar letters of reference indicate corresponding parts in all the views.

Figure 1 is a view of an axle provided with a nut embodying my invention, the nut being shown in longitudinal section. Fig. 2 is an end view looking into the nut. Fig. 3 is a view of the outer end of the nut. Fig. 4 is a plan view of a countersunk washer which is placed nearest the axle to receive the head of the screw by which it is held in the nut, and Fig. 5 is a cross-section of the same on the line $x$ $x$ of Fig. 4.

The axle A is of the usual construction, having a shoulder $a$ to prevent the wheel from sliding inwardly upon it, and a thread $b$ upon the end to receive the nut which holds the wheel upon it.

The nut B is somewhat longer than the nut usually used upon a vehicle-axle, is provided with an inwardly-projecting flange B', which fits upon the bearing-surface of the axle A, holds the wheel in position thereon, and prevents dust from collecting in the thread of the axle, and with a thread $c$, which extends from the flange B' to the inner face of the nut and which fits the thread $b$ of the axle. The nut B is also provided with a number of washers $d$ and $d'$ of varying thickness, which fit into the end of the nut and which are held in place by a screw D, which passes through said washers and screws into a hole in the end or face $e$ of the nut. The washer $d'$ is placed nearest the end of the axle A, and is countersunk to receive the head of the screw D, so that when the screw is in position the face of the screw-head will be flush with the face of the washer $d'$, thus forming a smoother bearing-face to press against the end of the axle. The washers $d$ are of various thickness, so that by removing a washer or inserting a new one of a desired thickness the distance which the nut B and flange B' will project upon the axle may be regulated to a nicety.

The vehicle-hub will occupy the space on the axle between the shoulder $a$ and flange B' of the nut B. When the hub has worn away the shoulder $a$, which it always does, so as to cause too much play between the shoulder and the nut B, the slack may be taken up by removing one of the washers $d$ from the nut B, so that the nut may be screwed farther upon the axle.

To remove a washer $d$ from the nut B, the screw D is unscrewed from the end of the nut by means of a small screw-driver, which may be inserted therein. Then by tipping up the nut the washers $d$ $d'$ will fall out. A washer of suitable thickness is then removed and the remainder replaced in the nut, as before. As the shoulder $a$ and flange B' become badly worn, more washers will need to be removed, and consequently the end of the screw D will project through the face $e$ of the nut B, and it will be necessary to cut off the projecting end, that it may not become battered so as to prevent its easy removal.

Instead of placing the washers in the nut and holding them in place by a screw, as shown in the drawings and described above, the end of the axle may be tapped to receive a screw, and the washers may be thereby attached to the axle end. In this case the outer washer should be countersunk to receive the screw-head, and as the bearing parts become worn the washers may gradually be removed.

From the foregoing description it will be seen that my invention may be applied to vehicle-axles of all sizes and descriptions by simply making the nut and washers of a size to correspond with the size of the axle.

Having thus described my invention, I claim as new and desire to secure by Letters Patent—

As an improved article of manufacture, the axle-nut B, formed with the projecting flange B', and the thread c, extending from the flange to the inner face of the nut and provided with the washers d d', secured to the inner surface of the outer end of the nut by screw D, as specified.

OLE HANSEN.

Witnesses:
 LAURITZ LARSEN,
 IDA C. LARSEN.